United States Patent [19]
Zauderer

[11] 3,736,447
[45] May 29, 1973

[54] UNIFORM IONIZATION MEANS FOR MHD GENERATORS

[75] Inventor: Bert Zauderer, Bala Cynwyd, Pa.

[73] Assignee: General Electric Company, New York, N.Y.

[22] Filed: Sept. 27, 1971

[21] Appl. No.: 183,792

[52] U.S. Cl..........................................310/11, 310/4
[51] Int. Cl................................................H02k 45/00
[58] Field of Search.....................................310/11, 4

[56] References Cited
UNITED STATES PATENTS

| | | | |
|---|---|---|---|
| 1,717,413 | 6/1929 | Rudenberg | 310/4 |
| 2,210,918 | 8/1940 | Karlovitz et al. | 310/4 |
| 3,182,213 | 5/1965 | Rosa | 310/11 |
| 3,322,978 | 5/1967 | Lary et al. | 310/4 |
| 3,355,605 | 11/1967 | Okress | 310/11 |
| 3,374,370 | 3/1968 | Swift-Hooh | 310/11 |
| 3,525,000 | 8/1970 | Zauderer | 310/11 |

Primary Examiner—D. F. Duggan
Attorney—Allen E. Amgott, William G. Becker and Henry W. Kaufmann

[57] ABSTRACT

Temperature limitations imposed by available materials require provision of other than purely thermal means for ionizing gas used in hot-gas magnetohydrodynamic (MHD) generators. Efficiency of such generators is markedly reduced by non-uniform ionization. Prior art ionization means, even when adequate, require use of appreciable fraction of length of expensive MHD channel to achieve high and uniform conductivity of gas plasma. Hot, cesium-seeded partially ionized gas passes through large-diameter conduit from source to nozzle feeding MHD channel. Magnetic field in pre-channel nozzle and conduit portions causes current flow in gas between short-circuited electrode pairs or pairs are fed repeated short high-voltage pulses continued by longer lower voltage pulses. Such current flow increases ionization everywhere in gas to desirable high and uniform level. Alternatively, gas not so seeded is ionized by irradiation from nuclear heat source; or gas not ionized is preionized by discharges between first pairs of electrodes, and then fully and uniformly ionized by discharges between later pairs of electrodes.

5 Claims, 7 Drawing Figures

Patented May 29, 1973 3,736,447

UNIFORM IONIZATION MEANS FOR MHD GENERATORS

The Invention herein described was made in the course of or under a contract or subcontract thereunder, (or grant) with the Department of the Navy.

CROSS-REFERENCE TO RELATED APPLICATION

THERMIONIC CATHODES FOR MHD GENERATOR, by Bert Zauderer, Ser. No. 178,881, filed Sept. 9, 1971, assigned to the assignee of the present application.

BACKGROUND OF THE INVENTION

1. Field of the Invention

This invention pertains to magnetohydrodynamic generators employing flowing ionized gas.

2. Description of the Prior Art

The ideal magnetohydrodynamic (hereafter MHD) generator would employ gas sufficiently hot to be a highly and uniformly ionized plasma; but this is not feasible for a continuously operating device because the temperatures required would exceed the melting points of any materials available for its construction. Therefore it has been customary to seed the gas with cesium to promote ionization, and to operate at gas temperatures, e.g. 2000° K, which can be borne by refractory metals and ceramics. The degree of ionization produced by such temperatures even in seeded gas is insufficient to produce the high plasma conductivity required to produce high efficiency in the generator. Therefore it has been known to provide opposed electrodes, short-circuited in pairs, in a region of magnetic field, so that the interaction between the charges which exist and the magnetic field will cause the flow of currents which will increase the existing ionization. It is also known, where the original ionization is inadequate, to apply high-voltage pulses between pairs of electrodes instead of short-circuiting them, in order that the intermittent breakdowns which occur may furnish further ionization.

These methods have a number of disadvantages, as they have been applied. Since the basic process of converting thermal energy into electrical energy involves heating the gas in a chamber to increase its pressure and then expanding it through a nozzle to convert the pressure energy into kinetic, the resulting adiabatic temperature reduction militates against ionization. Furthermore, although it has recently been recognized that high uniformity of ionization is necessary to high efficiency, the prior art methods of ionization have not directly produced uniform ionization across the cross section of a gas; to the extent that this has been produced it has occurred during the passage of the initially nonuniformly ionized gas through an appreciable length of generator channel before it achieves a uniformity whose benefits are enjoyed only during passage through the downstream remainder of the channel. Since MHD channel is expensive because of the particularly stringent requirements it must meet, this is wasteful. However, even worse is the fact that the upstream part of the channel operates inefficiently because of nonuniform ionization, and the losses there will keep the total efficiency low however high the efficiency achieved at the downstream part.

SUMMARY OF THE INVENTION

I provide ionization means which are at least initially operative upon the heated (and, preferably, cesium-seeded) gas at substantially stagnation conditions—that it, at approximately the temperature which exists in the hot gas source. This I achieve by leading the hot gas from the source in a thermally insulated duct of such large crosssection that the gas velocity is not more than 0.1 Mach; this minimizes the temperature drop produced by expansion of the gas to produce the indicated velocity, and so preserves ionization at the level corresponding to approximately the stagnation temperature. I then provide means to increase the ionization of the gas during expansion through a nozzle. Such means are applied in a relatively short nozzle leading into the MHD generator channel proper, and may extend into the initial part of the channel itself. The virtue of initiating the ionization enhancement in the nozzle is that the process operates upon the gas prior to large adiabatic cooling. If the gas flow is subsonic the nozzle entrance will have a continuously changing section, but for supersonic flow a sharp corner may be used at the nozzle throat.

In a noble gas at a temperature of 2,000° K and a few atmospheres pressure, seeded with cesium in a concentration of a fraction of a percent, the electron concentration is of the order of $10^{12}$ per cubic centimeter, which would be reduced by recombination if the gas were cooled by expansion and/or flow through a substantial length of heat-lossy duct, which my invention largely avoids as I have described. A first means of enhancing this ionization which I teach is to provide a magnetic field (which may be a fringe of the field applied to the MHD channel proper) transverse to the direction of flow through the nozzle; and on axes orthogonal to this magnetic field and to the flow direction to provide opposed pairs of electrodes, the cathodes being thermionically emissive, segmented at least with respect to the flow direction, or axis, and preferably also subdivided at right angles to the axis. In any event, the electrodes are paired—that is, for each cathode there is a single opposed anode; and the electrodes of each pair may be connected to each other, but individual pairs are insulated from each other. If the initial ionization is sufficiently high and the gas velocity and magnetic field are of sufficient magnitude, the current flowing between electrodes in each pair will cause increase in ionization, and will increase the average energy of the electrons so that the ionization will not only be enhanced, but become relatively more stable because the probability of capture of a high energy electron is low. Since the current flow tends to decelerate the gas flow, by an amount also proportional to the magnetic field intensity, it may be that in a given design the magnitude of current flow required to produce an acceptable electron density (e.g. 5 × $10^{13}$ per cubic centimeter or more) will be so great as to produce excessive deceleration. In such case, the electrodes of each pair may be disconnected from each other and connected to an individual source of high-potential pulses which will produce large ionization of the gas lying between the electrodes and current will flow from the source through the gas thus highly ionized. But since the gas is flowing, the highly ionized channel will be swept away from the electrodes, breaking the highly ionized path, and requiring another high-potential discharge to start another pulse of current. This will have the undesirable effect of producing moving striations of highly ionized gas lying transverse to the flow direction, with intervening portions of gas relatively little ionized. This nonuniformity is highly undesirable. Therefore I modify the high potential source so that, after the ionized path has been established by the high-potential discharge, a lower potential is provided which continues the ionization at the trailing edge of the striation, producing a smearing of the striation, although ultimately the low-potential discharge will be extinguished by the sweeping away of the gas. If high-potential pulses are provided at a rate determined inter alia by the gas velocity and the gas conditions, a new high-potential discharge will occur just as the low-potential discharge which followed the previous high-potential discharge ceases. Thus a continuum of highly ionized gas will be sustained along the flow axis; and by suitable disposition of electrode pairs this may extend across substantially the entire cross section of the gas stream. Since the magnetically induced field is not of primary importance in the functioning of this method, it is useful to place the electrodes of a pair so that the axis joining them is parallel to the magnetic field existing (which in this case is not essential but may be present from e.g. the main generator field) so that the striations will not be distorted by interaction with it, in the fashion well known in the blow-out magnets used in circuit breakers. A discharge parallel to a magnetic field, on the other hand, tends to be stabilized somewhat by the known focussing effect of a field so oriented.

The use of thermionic cathodes is desirable in order to reduce the electrode drop and thus reduce the power required for ionization. Such electrodes may be cesiated, either of the dispenser type or, if the cesium present from seeding is sufficient, by the ambient cesium; or they may be oxide-coated refractory cathodes, absent cesium. Various ways of providing adequate cesium to thermionic cathodes without raising the cesium concentration in the gas mass proper to undesirably high values are taught in my copending application, Ser. No. 178,881, filed Sept. 9, 1971, entitled Thermionic Cathodes for MHD Generator, identified by docket number 39-SE-2021, and assigned to the assignee of this application, to which reference is made for its teachings.

The importance of my invention is essentially what may be described as physically economic. The purpose of an MHD generator of the kind described is to convert heart energy into electrical energy. For both economical and ecological reasons it is desirable that this be done as efficiently as possible. This requires that (a) the highest feasible temperature be used, but this is limited by available materials, so (b) ionization means must be provided to render as efficient as possible a generator operating at a permissibly low temperature. But ionization requires consumption of energy. The use of thermionically emissive cathodes reduces the energy requirements, as does the use of two different potentials applied to the preionizing electrodes. Providing the ionization means as close as possible to the generating channel minimizes the degree of ionization which such ionizing means must produce, since the ionization dies out with time, and the shorter the time interval between ionization of a given volume of gas and its use in generation the less such loss will occur. Furthermore, when the thermal ionization initially existing is sufficient for enhancement without the use of energy-consuming means to produce initial ionization, the use of a thermally insulated duct of large cross section so that the gas is presented at approximately stagnation temperature, uncooled by large adiabatic expansion, provides further economy. In an actual test of a generator according to my invention it was found that the ionization means consumed energy equal to only ten percent of the energy output of the generator; and the efficiency of the generation process itself was enhanced by the high and uniform conductivity of the resulting ionized gas, or plasma. Since the ionization renders the gas capable of efficient use immediately upon its entry into the generator channel, the length of generator channel required for a given output is also minimized; since such channel is expensive to construct, such efficient utilization of the channel also reduces the cost of the installation, and its fixed charges.

DESCRIPTION OF THE PREFERRED EMBODIMENTS

Figure 1:
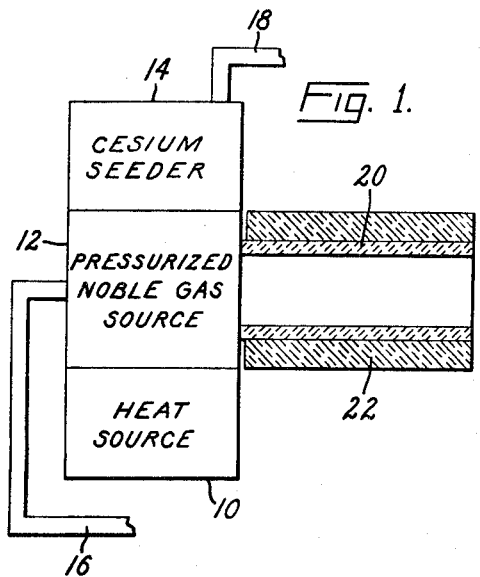
FIG. 1 represents schematically and partly in section a source of hot seeded noble gas under pressure.

FIG. 1 represents a conventional source of heat 10 in thermal connection with a conventional source 12 of noble gas under pressure, heated by source 10, and seeded with cesium from seeder 14. Gas duct 16 is represented as furnishing replenishment of noble gas to 12 from a source not shown in FIG. 1, and cesium duct 18 is represented as furnishing replenishment of cesium to seeder 14, from a source not shown in FIG. 1. Thus far, only the conventional art has been represented. Duct 20 is shown in section, and serves to carry seeded hot noble gas from source 12 at a velocity not greater than 0.1 Mach, so that the gas is at substantially the stagnation conditions of pressure and temperature prevailing in source 12. In order that cooling of duct 20 may not alter the temperature substantially, it is provided with thermal insulation 22, also shown in section. Thus at the exit from duct 20, the gas will still be nearly as hot and hence as highly ionized as it is under stagnation conditions.

Figure 2:
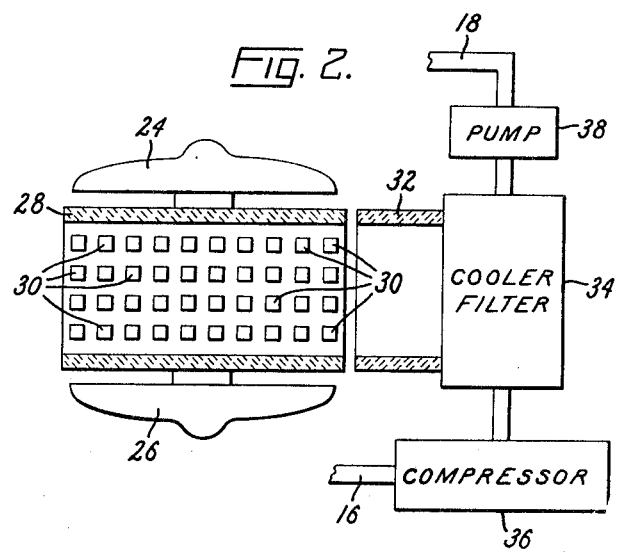
FIG. 2 represents schematically and partly in section a conventional portion of an MHD generator and associated equipment.

Delaying the disclosure of the various embodiments of preionizer in order to complete the description of the more or less conventional apparatus in which it functions, FIG. 2 represents the generator proper with certain conventional auxiliaries. Magnet poles 24 and 26 provide a field transverse to the flow axis of a refractory insulating (and therefore ceramic) channel 28, shown in section. Its section normal to the paper is rectangular, so that its top and bottom (which appear in section in FIG. 2) and its back wall, like the front wall which has been removed by the sectioning, are all planar. On the back wall of chamber 28 there are represented a plurality of generator anodes 30, subdivided both axially and also transversely to the channel axis (cf. U.S. Pat. No. 3,525,000), electrically separate from each other, each having an electrical connection extending through the channel back wall to the exterior of the channel 28 for connection to a load. In the front wall of the channel 28, which does not appear because it has been removed by the sectioning, there are an equal number of generator cathodes, preferably thermionically emissive, which may profitably be in accordance with the teachings of my copending application previously referenced. For each power anode 30 there is a power cathode lying opposed to it on a line orthogonal to the channel 28 axis (which is horizontal in FIG. 2) and to the planes of the walls of channel 28 in which the electrodes are installed—that is, to the plane of FIG. 2. Thus the generator electrodes form pairs of one generator anode and one generator cathode in each pair; and it is part of the known art that it is usually preferable to connect independent loads separately to each pair of generator electrodes.

An exit duct 32 of refractory ceramic is shown, in section, as connected to the end of channel 28 to lead the seeded noble gas to cooler-filter 34, where the cesium vapor is condensed and the resulting droplets, together with any casual particles, are filtered out; and the noble gas is cooled and returned to compressor 36, which raises it to a pressure sufficient to permit its return, via duct 16, to source 12. The cesium, not liquid after its condensation, is similarly returned by pump 38 via duct 18 to cesium seeder 14 for reuse. Except to the extent that the teachings of my referenced copending application are embodied in the thermionic cathodes, the embodiment represented in FIG. 2 is conventional in the known published art.

Figure 3:
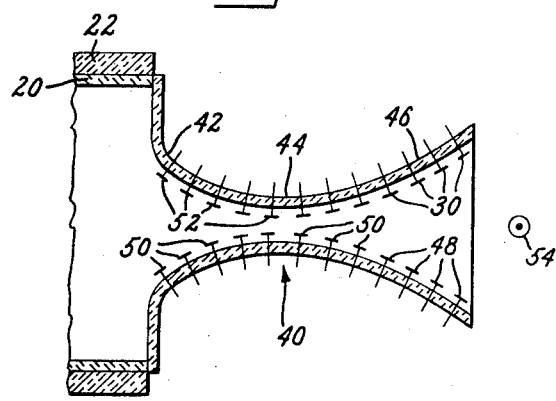
FIG. 3 represents schematically and partly in section an embodiment of my invention.

FIG. 3 represents in section a nozzle designated generally as 40, having planar bottom shown in FIG. 3, planar top not shown because removed by the sectioning of the drawing, and side walls which appear in section and are singly curved—that is generated by the motion of a straight line moved always parallel to its initial position but not in a single plane. Nozzle 40 has an entry portion 42 connected to duct 20, tapering to its narrowest part throat 44, and then having an expanding portion 46 which is connected to the entry to channel 28, and may, indeed, be integral with it in practice, so that the numerical references refer to regions rather than necessarily physically separate parts. Indeed, four columns of generator anodes 30 are represented, the projection in FIG. 3 corresponding to plan view, from above, while that in FIG. 2 corresponds to an elevation from the side. Hence in FIG. 3 the generator anodes 30, which appear "full face" in vertical columns in FIG. 2, appear "in profile" in FIG. 3, and the top generator anode in each column masks those below it. For simplicity in the drawing, the generator anodes 30 (and all other electrodes in FIG. 3) have been represented simply symbolically, with lines from them passing through the wall of nozzle 40 to represent their electrical connection with the exterior of the nozzle. In practice, the anodes will conveniently be of a refractory metal such as tungsten, and be of rather substantial cross section where they pass through the wall in order that their temperature may be adjusted by appropriate thermal design. It is preferable that the anodes, including the generator anodes, be relatively cool, since they need not, and preferably should not, emit electrons in significant density.

Generator cathodes 48 are represented in four columns in the wall of expanding portion 46 of nozzle 40 opposite the generator anodes 30. The generator cathodes being equal in number to the generator anodes 30, and each such cathode being opposed to and paired with one and only generator anode. The generator cathodes 48 may be of refractory material oxide coated; but they are preferably of tungsten cesiated with cesium vapor in accordance with the teachings of my copending application. Their temperature at the faces exposed to the interior of nozzle 40 should be appropriate to produce copious thermionic emission from the surface. This temperature will depend upon the particular emissive surface provided, and it is desirable that the generator cathodes 48 actually have a very substantial cross section extending through the nozzle wall in order that the temperature of the surface exposed to the hot gas may be controlled by external cooling or heating as the particular design and operating conditions may dictate.

Upstream from the generator cathodes 48, extending back through throat 44 and into entry portion 42, there are represented columns of ionizing cathodes 50, preferably identical with generator cathodes 48 and differing only in function. Similarly, opposed to ionizing cathodes 50 there are represented columns of ionizing anodes 52, preferably identical with generator anodes 30. The ionizing cathodes 50 and anodes 52 are paired in one to one relation precisely like the generator anodes 30 and cathodes 48.

A circle with central dot, the conventional end-on representation of the head of an arrow, 54 represents the direction of the magnetic field produced by pole pieces 24 and 26 of FIG. 2. This will have its full magnitude in the generator channel 28, but its fringing will cause it to exist in reduced magnitude in nozzle 40, the magnitude in the nozzle being capable of adjustment by the exact design of the pole pieces 24 and 26, which may be made wide enough to extend also over all or part of nozzle 40.

Figure 4:
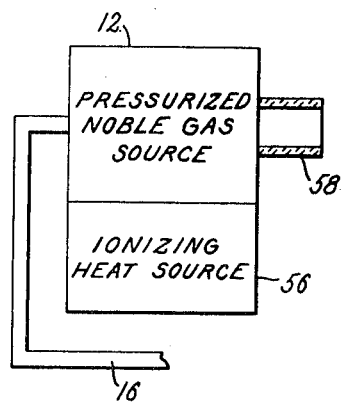
FIG. 4 represents schematically and partly in section a source of hot ionized noble gas under pressure.

In one mode of procedure, each ionizing cathode 50 is connected electrically to the ionizing anode 52 with which it forms a pair; each such pair is insulated from all other such pairs. The hot seeded gas in duct 20 is somewhat ionized, at approximately the stagnation temperature. It is part of my teaching that nozzle 40 be made sufficiently short that the time of passage of a given volume of gas from duct 20 through the nozzle is less than the ionization relaxation time of the seeded gas, so that the degree of ionization will at least not decrease markedly during such passage. However, the electrical conductivity produced by such ionization at permissible gas temperatures is insufficient for efficient generator operation. Current flow between the connected ionizing cathode and ionizing anode of each pair, produced by the Faraday field created by the motion of the gas ions through the magnetic field will enhance the initial ionization of the gas, so that when it moves between the generator electrode pairs it will be sufficiently conducting for efficient generation. In particular, the electron average energy, or temperature, will be greatly increased. Since the gas velocity will in general be fixed by the desired operating conditions, the magnetic field may be adjusted to provide current adequate to provide an electron density of e.g. $5 \times 10^{13}$ per cubic centimeter, which suffices for efficient generator operation. However, if the combination of current and magnetic field required to achieve this is so great that the resulting deceleration of the gas reaches objectionable values, it may be more efficient to apply potentials from an external source to the electrodes of a pair. This may be applied only to the electrodes in the first few upstream columns of ionizing electrodes, where the induced voltages will be low because the gas velocity is low there; or it may be applied to all the ionizing electrode pairs, in which event it is permissible to have the ionizing electrodes so oriented that the line joining any pair is parallel to the magnetic field; or the magnetic field need not extend to the preionizing electrode region. The method described in connection with FIG. 3 assumes some appreciable ionization in the gas entering the nozzle, of the order of $10^{11}$ per cubic centimeter, which will ordinarily be produced either by cesium seeding of a hot gas, but may be produced, if a radioactive source of heat is employed, by ionization created in unseeded gas by irradiation from the source occuring simultaneously with the heating. FIG. 4 represents the modification of FIG. 1 with such a source would entail. Pressurized noble gas source 12 remains, as does duct 16 for replenishing the supply of gas, but cesium seeder 14 is not present, and simple heat source 10 is replaced by ionizing heat source 56. Since thermal ionization is not particularly effective, the duct 58 leading the gas from source 12 need not be made of large cross section to avoid adiabatic cooling, but should be short since the gas ionization will begin to decrease immediately upon the removal of the ionized gas from the vicinity of the ionizing heat source 56.

Figure 5:
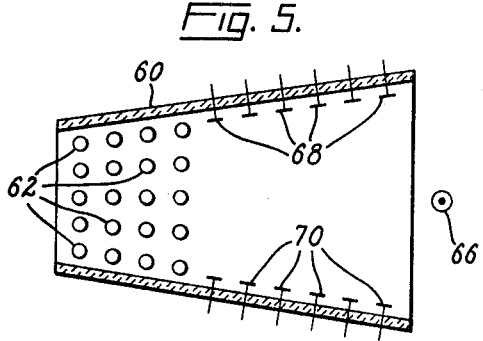
FIGS. 5 and 6 represent schematically and partly in section plan and elevation of another embodiment of my invention.
Figure 6:
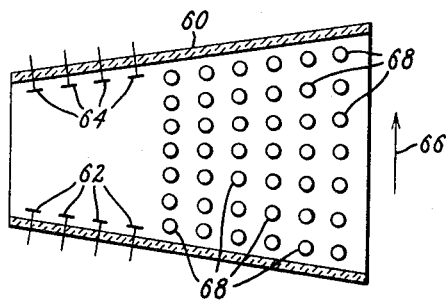
Figure 7:
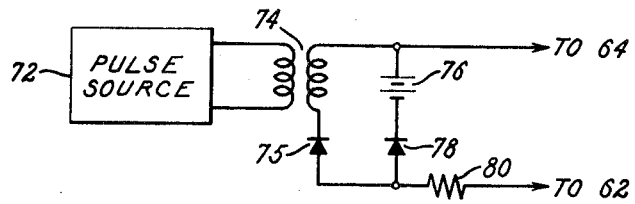
FIG. 7 represents an electrical circuit which is suitable for use in my invention.

FIGS. 5 and 6 represent an alternative manner of providing preionization in a gas inadequately ionized (e.g. $10^{10}$ per cubic centimeter or less). In this embodiment, externally supplied electrical energy is relied upon completely to produce the requisite high uniform ionization, so that the nozzle length is of no importance, so long as it is consistent with efficient conversion of the pressure energy of the gas to kinetic energy. The ionizing electrodes are located in a channel which is effectively part of the generator channel. FIG. 5 represents a sectioned top view and FIG. 6 represents a sectioned elevation, so that the description will apply to both simultaneously. Refractory insulating channel 60 is provided at its upstream end, which is connected to the exit from the expansion nozzle to receive hot gas moving at high velocity, with ionizing cathodes 62, similarly to the provision of ionizing cathodes 50 in FIG. 3. Opposed to each ionizing cathode 62 is an ionizing anode 64. The line joining an ionizing cathode 62 with its paired ionizing anode 64 is parallel to the magnetic field represented by arrow 66. Generator anodes 68 are opposed to generator cathodes 70, paired one to one, the generator cathodes being thermionically emissive like ionizing cathodes 62 and the other cathodes previously mentioned. Between each ionizing cathode 62 and its paired ionizing anode 64 there is connected a source of electrical potential having the characteristics of the embodiment represented by FIG. 7. A high-voltage pulse source 72 is connected to pulse transformer 74, whose secondary is in parallel via diode 75 with a low-voltage source 76 in series with a diode 78. From this parallel combination leads extend to an ionizing anode 64 and an ionizing cathode 62 of the same pair. The high-voltage pulse source 72 produces a pulse of perhaps a microsecond duration which appears at the secondary of pulse transformer 74, blocks diode 78, and, being applied to ionizing anode 64 and ionizing cathode 62, breaks down the gas between them, producing an ionization density of perhaps $10^{11}$ electrons per cubic centimeter. The discharge will be somewhat in the shape of a tube of ionized gas because of the focussing effect of the magnetic field 66. After the pulse has died out, diode 78 is unblocked and low-voltage source 76 sustains the ionization for a time; but the volume of ionized gas is being swept down stream so that ultimately the low-voltage discharge ceases. A new pulse from source 72 then initiates a repetition of the cycle. The frequency of pulses from source 72 is adjusted to match the duration of the cycle; for a gas velocity of a kilometer per second and a pulse voltage of a kilovolt, the repetition rate or frequency of pulses from source will be of the order of 10 kilohertz. Each pair of ionizing electrodes is connected to a separate circuit having high-voltage pulse followed by longer low-voltage; but all high-voltage pulses are simultaneous. The spacing between successive columns of ionizing electrodes should be somewhat greater than the diameter of the discharge column produced by the high-voltage pulse. The net effect of the two-voltage discharge is that the initial pulse provides an electron density of e.g. $10^{11}$ per cubic centimeter, and the prolonged low-voltage discharge increases this to $10^{13}$ or more; and the ionization is substantially uniform. Experience has shown that high-voltage pulses alone produce separate columns of ionization which yield very low generator efficiency.

If it is desired to increase the ionization above that produced by the embodiment described, the first few columns of electrode pairs represented as generator electrodes may be short-circuited and used like ionizing electrodes 42 and 50 of FIG. 3 to enhance the ionization still further.

The variety of embodiments I have disclosed require a recapitulation of the common inventive concept they teach. There is a basic transition point at about $10^{11}$ electrons per cubic centimeter in the manner in which a gas may be treated to further ionize it. If it has at least the stated free electron concentration its ionization may be enhanced to that required for MHD generator operation, i.e. $5 \times 10^{13}$ electrons per cubic centimeter, by simple passage between pairs of short-circuited ionizing electrodes in the presence of a transverse magnetic field; or the same pairs of ionizing electrodes may be employed, but with an external potential source rather than the Faraday field resulting from passage of the ionized gas transversely to the magnetic field. In either case, there is a voltage source in the circuit of each pair. In the general case including either mode of operation, the ionizing electrodes extend upstream along the flow axis to a source of gas having the requisite electron density of $10^{11}$ electrons per cubic centimeter. Such gas may be provided in numerous ways. It may be cesiated and heated, conducted through a thermally insulated duct of such cross section that the velocity of the gas flow (and the required gas flow, obviously, will be whatever is required for the generator to produce its required output) is not greater than 0.1 Mach. Or it may be ionized e.g. by radiation from a nuclear source which also provides the heat for operation of the generator, in which case the gas need not be conveyed at low velocity as in the preceding case, but should be conveyed to the ionizing electrodes rapidly in order that the ionization may not decrease appreciably before reaching them. If the gas as provided from the source of hot noble gas has an electron density appreciably less than $10^{11}$ electrons per cubic centimeter, then the first few columns of what have been called ionization electrodes actually function as preionization electrodes to being the gas up to the requisite $10^{11}$ electrons per cubic centimeter, and so serve as the source of gas so ionized for the remaining ionizing electrodes. It would be possible thus to employ preionizing electrodes as a source of gas so ionized for short-circuited pairs of ionizing electrodes; but, while this might prove economical in some particular design, I prefer generally to apply to the ionizing electrodes the same cyclical potential, consisting of a first high-potential pulse followed by a longer low-potential pulse, which I apply to the electrode pairs which serve as preionizing electrodes. It is necessary to define an axis for the circuit formed through the gas between the ionizing anode and the ionizing cathode of a given pair. Since the electrodes are of finite dimensions, the reference to a line joining them is theoretically inexact; but I use the term to mean a line joining their geometric centroids. Similarly, when a magnetic field is described as normal or orthogonal to such a line, it is evident that my invention will not suddenly cease to function if the magnetic field is at e.g. 89° or 91° to such a line, and that the term "magnetic field" refers in such case to the orthogonal or normal magnetic field component. Similarly, the use of the term "relaxation time" with reference to the decay of ionization is not intended to be confined only to an exact mathematical period, but rather to refer to a time such that the ionization decays substantially. Since all the physical laws involved (including those, such as ionization, which are statistical) are mathematically continuous, it is evident that small deviations from recited conditions will produce only small deviations from the optimum, and may thus produce acceptable results departing only slightly from the optimum, and my claims are to be understood as including such small deviations which, in practice, necessarily occur.

What is claimed is:

1. In a magnetohydrodynamic generator comprising:
   a. a source of hot noble gas under pressure connected to
   b. a refractory insulating channel provided with
   c. a plurality of pairs of generator electrodes each consisting of a generator anode and a generator cathode located in opposition to each other in opposite walls of the channel, and having individual electrical connections extending through the channel wall to the outside of the channel, and
   d. a generator magnetic field extending transverse to the axis of flow through the channel and transverse to the line joining a generator anode and a generator cathode of a same pair,
   the improvement comprising:
   ionization enhancement means comprising
   e. a plurality of pairs of ionization electrodes, each pair consisting of a thermionically emissive cathode and an anode opposed to the cathode, forming a path between the anode and cathode for flow of ionized gas orthogonally to a line between the anode and cathode;
   f. connection means between the anode and the cathode, external to the gas flow path, forming a closed circuit for electron flow from the cathode through the gas to the anode, and back to the cathode through the connection means;
   g. a voltage source in the said closed circuit to cause the flow of current in the said closed circuit;
   h. the pairs of ionization electrodes being subdivided along the axis of flow of gas between them, and extending normally to the axis so that the portions of gas between them extend across substantially the entire gas path,
   and extending downstream along the axis to a point immediately adjacent to the generator electrodes
   and extending upstream along the axis to a source of gas having an electron density of at least $10^{11}$ per cubic centimeter.

2. The improvement claimed in claim 1, further comprising:
   i. an expansion nozzle having an entry portion and a throat and an expanding portion,
   j. the entry portion being connected to receive therein said hot noble gas under pressure having an electron density of at least $10^{11}$ per cubic centimeter;
   k. the therein said pairs of ionization electrodes are located in the walls of the entry portion and of the throat and of the expanding portion; and
   l. the length of the expansion nozzle is such that the time of passage of the said gas through it is less than the ionization relaxation of the gas.

3. The improvement claimed in claim 2 in which
   m. the therein said hot noble gas under pressure and having an electron density of at least $10^{11}$ per cubic centimeter is seeded with cesium; and
   n. the source of the herein said gas is connected with the entry portion of the said expansion nozzle by a thermally insulated duct of cross section sufficiently large that the velocity of gas flow through it is not greater than 0.1 Mach.

4. The improvement claimed in claim 1 in which
   o. the therein said source of hot noble gas under pressure provides gas having an electron density of less than $10^{11}$ per cubic centimeter;
   p. pairs of preionization electrodes identical with the pairs of ionization electrodes recited in h) of claim 1 are located upstream of the said pairs of ionization electrodes and
   q. there is applied to each pair of preionization electrodes and to each pair of ionization electrodes a cyclical potential of which one cycle consists of a high potential pulse followed by a lower potential pulse of longer duration than the high potential pulse.

5. The improvement claimed in claim 1 in which the therein said voltage source g) is provided by the interaction of the ionized gas moving between the ionizing cathode of an ionizing electrode pair and its associated ionizing cathode, with a magnetic field component normal to the direction of motion of the gas and of a line joining the electrodes of a pair.

* * * * *